United States Patent [19]

Wada et al.

[11] Patent Number: 5,206,684

[45] Date of Patent: Apr. 27, 1993

[54] RECORDING APPARATUS INCLUDING A MEMORY INTO WHICH INFORMATION IS WRITTEN IN A PARTICULAR ORDER AND FROM WHICH MEMORY INFORMATION IS READ IN THE REVERSE ORDER

[75] Inventors: Kenichi Wada; Tsukasa Yagi; Tomohiko Masuda; Hirohisa Kitano; Ken Matsubara; Kohichi Shingaki, all of Osaka, Japan

[73] Assignee: Minolta Camera Kabushiki Kaisha, Osaka, Japan

[21] Appl. No.: 493,367

[22] Filed: Mar. 14, 1990

[30] Foreign Application Priority Data

Mar. 14, 1989 [JP] Japan ................................ 1-62722
May 9, 1989 [JP] Japan ................................ 1-116869

[51] Int. Cl.[5] .......................................... G03G 15/00
[52] U.S. Cl. .................................. 355/203; 355/204; 355/311; 395/115; 395/116
[58] Field of Search ............... 355/203, 204, 202, 308, 355/311, 319, 321, 323, 325; 364/200, 900; 346/150; 358/296, 444, 404; 395/115, 116

[56] References Cited

U.S. PATENT DOCUMENTS

| | | |
|---|---|---|
| 4,046,471 | 9/1977 | Branham et al. . |
| 4,116,558 | 9/1978 | Adamek et al. ................ 355/24 |
| 4,334,765 | 6/1982 | Clark . |
| 4,487,506 | 12/1984 | Repp et al. . |
| 4,538,906 | 9/1985 | Brown . |
| 4,568,169 | 2/1986 | Wada et al. . |
| 4,602,776 | 7/1986 | York et al. ........................ 271/4 |
| 4,609,282 | 9/1986 | Crandall ........................ 271/279 |
| 4,627,706 | 12/1986 | Takahashi et al. ............... 271/292 |
| 4,630,230 | 12/1986 | Sundet ............................ 364/900 |
| 4,702,589 | 10/1987 | Ito ................................. 355/319 |
| 4,730,206 | 3/1988 | Sawada et al. . |
| 4,774,590 | 9/1988 | Haganuma et al. ............... 358/444 |
| 4,860,110 | 8/1989 | Kokubu ....................... 395/116 X |
| 4,893,153 | 1/1990 | Sales et al. ....................... 355/325 |
| 4,912,670 | 3/1990 | Hattori ....................... 395/115 X |
| 4,924,265 | 5/1990 | Partilla et al. ................... 355/204 |
| 4,980,721 | 12/1990 | Ishikawa et al. ................. 355/323 |
| 4,990,941 | 2/1991 | Kawai ........................... 346/153.1 |

FOREIGN PATENT DOCUMENTS 0127871 7/1985 Japan ............................ 358/444
60-204379 10/1985 Japan .

Primary Examiner—A. T. Grimley
Assistant Examiner—T. A. Dang
Attorney, Agent, or Firm—Burns, Doane, Swecker & Mathis

[57] ABSTRACT

A recording apparatus including a memory for storing recording information input from an external device, and an optical printing head for recording the information read from the memory onto recording paper. A writing device writes the information into the memory in the order of input, and stops the writing operation when the information as stored in the memory reaches its capacity. A reading device reads the recording information from the memory in the order opposite to the order in which the information is written, and transmits the information to the printing head for recording. The writing operation is resumed after this information is recorded on the recording paper.

19 Claims, 8 Drawing Sheets

RECORDING APPARATUS INCLUDING A MEMORY INTO WHICH INFORMATION IS WRITTEN IN A PARTICULAR ORDER AND FROM WHICH MEMORY INFORMATION IS READ IN THE REVERSE ORDER

TECHNICAL FIELD

The present invention relates to recording apparatus including various printers such as laser beam printers, LED printers and other optical printers, and copying machines of the electrostatic transfer type. In particular, the present invention relates to recording apparatus as noted above which are capable of recording images corresponding to input information or original documents on one or both sides of copying paper.

BACKGROUND OF THE INVENTION

In the type of optical printer noted above, generally, the toner transferred to the copying paper in an electrophotographic process is maintained in an unfixed condition until the copying paper reaches a fixing device. In order to avoid the necessity of providing a special means for toner adhesion, the recording paper is transported to the fixing device with the recorded side facing up. The recording paper is discharged in the same face up state after the fixing process. The recording paper thus discharged is stacked with new sheets successively overlying preceding sheets.

According to this arrangement, however, when recording information spanning a plurality of pages is recorded on separate sheets of recording paper, new sheets are successively placed on preceding sheets with their recorded sides facing up. With a machine constructed to start recording the first page of documents, the order of the pages becomes reverse of the proper order of to recorded information. This requires a manual operation after a recording operation for rearranging the sheets to put the pages in an ascending order from top to bottom.

This rearranging operation is increasingly troublesome as the number of pages of recorded information increases. There are recording apparatus having means for dispensing with the manual rearrangement. One type of such apparatus includes a reversing device for discharging recording paper face down after a recording operation, thus in the order of the page numbering. The other type includes a memory for storing an entire piece of input recording information spanning a plurality of pages, and starts recording the part of the information corresponding to the final page. With the second type of apparatus, therefore, recording paper is discharged face down already in the order of the page numbering.

The above known apparatus have the following problems.

In the apparatus including the paper reversing device, this device occupies a large space for turning over the recording paper. As a result, the apparatus must have a large overall construction, particularly if the reversing device is provided in addition to an existing paper face-up discharge device. With a printer which simply records input information, compactness may be possible to some extent with an arrangement for stacking recording paper discharged after being reversed by the reversing device on a tray or the like mounted on a top surface of the printer. However, with a recording apparatus having both a digital function for recording input recording information dot by dot and an analog function for copying documents (which has been used increasingly in recent years and is often called a digital-analog copier), such a discharge arrangement cannot be employed since a document table is provided on the top surface of the apparatus. It is especially difficult to provide the latter apparatus with the paper reversing device without incurring the problem relating to space.

Regarding the apparatus including a memory for storing information spanning a plurality of pages to start printing the final page, the number of pages of recording information constituting one document is variable and sometimes exceeds one hundred. This means that, in order to realize the page arrangement, a large capacity memory is required to meet the rare recording conditions in which information is recorded on a great number of pages. Such a construction has no advantage from the point of view of cost performance.

The conventional recording apparatus also have the following problems when recording information on both sides of recording paper.

When recording image information spanning a plurality of pages on both faces of recording paper, i.e. duplex recording, the recording paper is fed from a paper supply section for recording an image on a front side thereof, and thereafter redirected for image formation on a reverse side thereof prior to discharge. In contrast with a simplex recording mode in which image are successively recorded on one side of recording paper supplied sheet after sheet, the duplex recording mode is interrupted by standby periods each occurring during a reversing operation required between image formation on the front side of one sheet and image formation on the reverse side thereof. Since such a standby period takes place with each sheet of copying paper, the entire recording operation is time-consuming.

SUMMARY OF THE INVENTION

An object of the present invention is to provide a compact and inexpensive recording apparatus capable of easily and speedily outputting recorded information in the order of the page numbering.

Another object of the invention is to allow the above recording apparatus to easily and speedily output recorded information in the order of the page numbering also when a duplex recording mode is selected.

The former object is fulfilled, according to the present invention, by a recording apparatus comprising memory means for storing recording information input from an external device; write control means for successively writing the recording information input from the external device into the memory means, and stopping a writing operation when the recording information as stored reaches a predetermined amount; read control means for reading the recording information from the memory means in an order opposite to an order in which the recording information is written; and recording means for recording the recording information read by the read control means onto recording paper.

With this recording apparatus, the read control means successively reads the stored recording information spanning a plurality of pages from the final page backward. Images corresponding to the recording information are formed on the recording paper, which is then discharged outwardly. Consequently, the information spanning a plurality of pages corresponding to the memory capacity is recorded on sheets of the recording paper discharged face up and stacked in the ascending order of page numbering from top to bottom. Each time the information spanning a plurality of pages is recorded, the recorded sheets of paper are treated as a batch having a proper page arrangement. A plurality of such batches may be sorted by controlling a sorter having a plurality of paper receiving bins, so that the bins are successively switched for receiving the recorded sheets as discharged. Alternatively, sorting paper different from the recording paper in color, size and/or orientation may be inserted between adjacent batches of the recording paper. As a result, the recorded sheets of paper are obtained in a plurality of batches which may simply be put in order after an entire document or the like has been recorded, which completes a page arranging operation thereof.

Particularly where a sorter is used, which usually is available as part of recording apparatus, the present invention involves only a simple modification to the control mode of the apparatus. In addition, the sorter may be controlled such that batches of the recorded sheets of paper as discharged rest in successively lower bins. This allows a plurality of batches to be assembled one upon another into a whole without changing their order, which greatly simplifies the manual operation.

To promote the page arrangement in a duplex recording mode, a recording apparatus according to the present invention comprises memory means for storing recording information spanning a plurality of pages; write means for writing the recording information into the memory means; read means for reading the recording information from the memory means; paper feed means for feeding recording paper from a paper supply section; recording means for recording the recording information read by the read means onto the recording paper; discharging means for discharging the recording paper carrying recorded information; and transport means for refeeding the recording paper carrying recorded information to the recording means as reversed, the transport means including reversing means for reversing the recording paper, an intermediate tray for storing plural sheets of the recording paper, branched passage means for delivering the recording paper carrying recorded information to the intermediate tray as stacked thereon, and paper refeed means for refeeding the recording paper from the intermediate tray to the recording means; wherein the apparatus has a duplex recording function including a first operation for successively recording information on the plural sheets of the recording paper fed from the paper supply section and delivering the recording paper to the intermediate tray, and a second printing operation carried out upon completion of the first printing operation for successively recording different information on the recording paper fed from the intermediate tray.

With this recording apparatus, when recording information spanning a plurality of pages, the first recording operation is carried out to record only the information corresponding to odd pages or even pages in the ascending or descending order successively on front sides of plural sheets of recording paper, and stack the recorded sheets on the intermediate tray of the paper refeed means. Then, the second recording operation is carried out to pick up the sheets of recording paper stacked on the intermediate tray, and record the information corresponding to the other pages, i.e. odd or even pages, on reverse sides of the sheets, which are successively discharged outwardly. When, for example, the sheets are picked up from the lowermost sheet, the second recording operation records the information in the same order, ascending or descending, as the first recording operation. On the other hand when the sheets are picked up from the uppermost sheets, the second recording operation records the information in the opposite order to the first recording operation. As a result, adjacent pages of information are recorded on the front and back sides of one sheet of recording paper. This allows the recording information to be recorded on the front sides of the sheets in such a way that, as soon as the recording means has recorded the information on one sheet and is ready for further recording, a succeeding sheet is fed thereto to start the recording. Similarly, the information may be recorded on the reverse sides of the sheets by feeding a succeeding sheet to the recording means as soon as the recording means is in a ready state without waiting for the sheet to be turned over for refeeding.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

An embodiment of the present invention will be described hereinafter.

Figure 1:
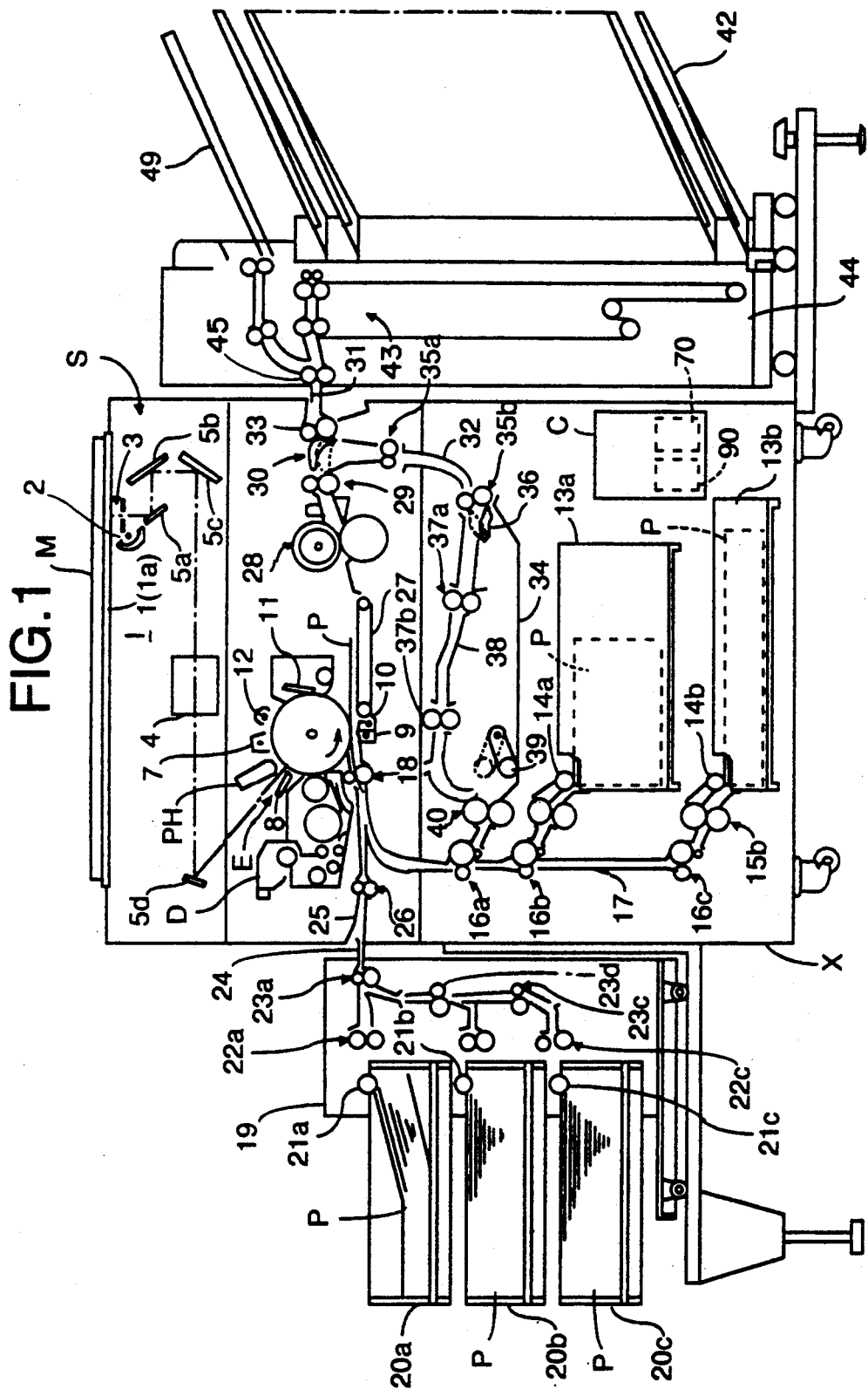
FIG. 1 is a schematic sectional view of a recording apparatus according to the present invention.

FIG. 1 is a sectional view of a slit scan type electrophotographic recording apparatus which is one example of an recording apparatus according to the present invention.

This recording apparatus comprises a document table 1 formed of a glass plate 1a, and an exposure lamp 2 for illuminating an original document M placed on the glass plate 1a. Light reflected from the document M passes through a slit 3 to be projected onto a photoreceptor drum 6 by an image forming optical system I including an image forming lens 4 and a plurality of mirrors 5a–5d. The drum 6 is rotatable at a peripheral velocity V counterclockwise in FIG. 1.

The exposure lamp 2, slit 3 and first mirror 5a constitute a scanning device S which is driven to scan the document M leftward in FIG. 1 at a velocity V/n (where n is a ratio of copying magnification). The second mirror 5b and third mirror 5c are movable leftward in FIG. 1 at half the velocity of the scanning device S, so that the image forming optical system I maintains a fixed length of image forming optical path.

The light reflected from the document M scanned by the scanning device S impinges on the photoreceptor drum 6. Electric charges applied uniformly over the surface of the drum 6 are selectively erased in accordance with the image-carrying light, thereby forming an electrostatic latent image on the drum surface.

The image forming lens 4 and fourth mirror 5d are driven by a motor to move right and left in FIG. 1. This movement changes the conjugate length of image forming optical system I, thereby varying copying magnification in a direction perpendicular to a scanning direction. When the image forming lens 4 and fourth mirror 5d are moved to set copying magnification to a ratio other than "1", the scanning velocity of the scanning device S is varied correspondingly, which varies copying magnification in the scanning direction. Thus, the image of document M placed on the document table 1 may be enlarged or reduced with a selected magnification ratio by varying the position of image forming lens 4 and fourth mirror 5d as well as the scanning speed.

The photoreceptor drum 6 is surrounded by a charging device 7 for uniformly charging the drum surface, an exposure station E at which the photoreceptor drum 6 is exposed to the light reflected from the document M for forming an electrostatic latent image thereon, a blank eraser 8 for removing the electric charge from portions of the photoreceptor drum 6 corresponding to blank portions of the document M, a developing device D for applying toner to the electrostatic latent image on the photoreceptor drum 6 to develop the latent image into a visible image, a transfer charger 9 for transferring the toner image from the drum 6 to recording paper P, a separating charger 10 for separating the recording paper P from the drum 6, a blade-like cleaning device 11 for removing excess toner adhering to the drum 6 after the image transfer, and a main eraser 12 for erasing residual charge from the drum 6 after the image transfer.

The recording apparatus further comprises an optical printing head PH disposed between a position of the photoreceptor drum 6 to which the light from the original document M is projected and the charging device 7, for forming an electrostatic latent image on the drum 6 in response to recording information input from outside.

Figure 2:
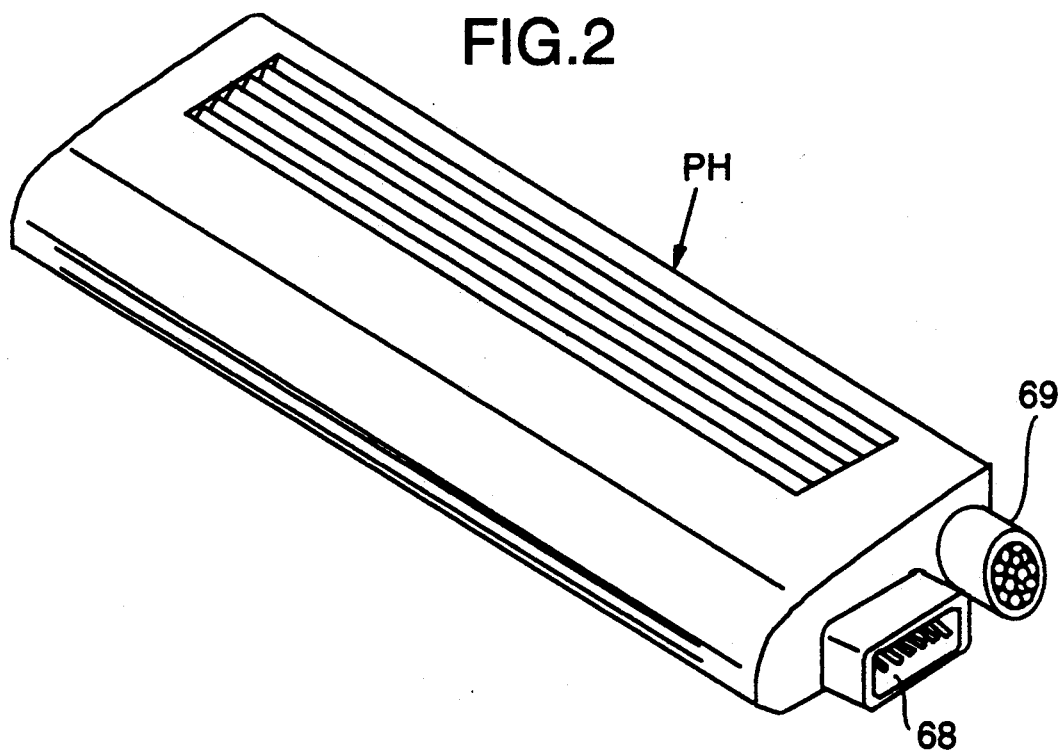
FIG. 2 is a perspective view of an optical printing head.
Figure 3:
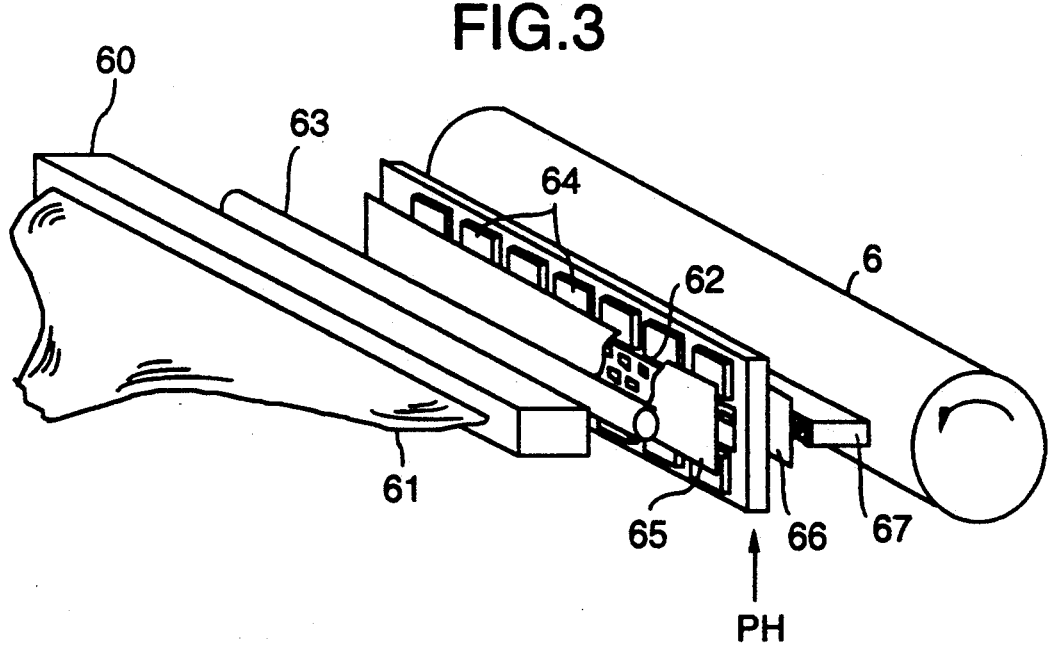
FIG. 3 is a perspective view of an interior of the optical printing head.

As shown in FIGS. 2 and 3, the optical printing head PH includes a plurality of optical fibers 61 for leading light from a light source (not shown) to a linear light emitter 60. The light emitted uniformly from the light emitter 60 is condensed by a rod lens 63 for impingement onto a PLZT shutter array 62 having a pixel-to-pixel coverage. Each shutter of the PLZT shutter array 62 is driven by a driver circuit 64. Opposed across the PLZT shutter array 62 are a polarizer 65 and an analyzer 66 having polarizing directions perpendicular to each other. A light beam having passed through each shutter of the PLZT shutter array 62 is condensed by a rod lens array 67 onto the photoreceptor drum 6.

When printing an image corresponding to the recording information input from outside by means of the optical printing head PH, the shutters of the PLZT shutter array 62 are selectively driven by the driver circuits 64 in response to the recording information input through a connector 68 from an input information storing memory which will be described later. Only those light beams having passed through the shutters in an operative state for rotating the polarizing directions are allowed to travel through the analyzer 66 to impinge on the photoreceptor drum 6. As a result, an electrostatic latent image corresponding to the recording information is formed on the drum 6. Reference numeral 69 in FIG. 2 denotes an optical fiber connector for inputting the light from the light source to the optical fibers 61 inside the printing head PH.

Reverting to FIG. 1, the electrostatic latent image formed by the printing head PH on the photoreceptor drum 6 is developed by the developing device 8 and then reaches the transfer device 9 with the rotation of the drum 6, as in the case of the image resulting from the light transmitted from the original document M on the document table 1 by the scanning device S and the image-forming optical system I.

Sheets of the recording paper P in two different sizes are stored on sheet feed trays 13a and 13b, respectively, which are mounted inside a main body X of the recording apparatus. The recording paper P of a designated size is picked up from the tray 13a or 13b one sheet after another by a pickup roller 14a or 14b. Then the paper P advances through a control roller pair 15a or 15b to a paper feed passage 17 including three feed roller pair 16a–16c. Thereafter the paper P reaches a timing roller pair 18 which feeds the paper P to the transfer device 9 in synchronized relationship with formation of an electrostatic latent image on the photoreceptor drum 6.

Further, a sheet feed stacker 19 is connected laterally of the main body X. The stacker 19 includes three sheet feed trays 20a–20c arranged vertically for storing recording paper P in three sizes all of which may be different from the sizes of paper P stored on the trays 13a and 13b inside the main body X.

When a size of recording paper P stored in one of the trays 20a–20c is selected, the recording paper P is picked up from the tray 20a, 20b or 20c one sheet after another by a pickup roller 21a, 21b or 21c. Then the paper P advances through a control roller pair 22a, 22b or 22c to a paper feed passage 24 including three feed roller pairs 23a–23c. Thereafter the paper P reaches the timing roller pair 18, and is fed to the transfer device 9 in synchronized relationship with formation of an electrostatic latent image on the photoreceptor drum 6 in the same manner as described above.

The construction for supplying the recording paper P from the paper feed trays 13a, 13b and 20a–20c to the transfer device 9 forms a paper supplying device PS.

The recording paper P, receives the toner image from the photoreceptor drum 6 at the transfer device 9 and is separated from the drum 6 by the separating device 10, and then is transported by a conveyer belt 27 to a fixing device 28. The fixing device 28 fixes the toner image to the recording paper P by heating and fusing the toner.

Thus, the optical printing head PH, photoreceptor drum 6, elements 7–12 surrounding the drum 6, paper supplying device PS, conveyer belt 27, fixing device 28, and a control system C described later, constitute an image forming device for forming, on the recording paper P, images corresponding to image information input from outside.

The recording paper P having passed through the fixing device 28 is drawn therefrom by a transport roller pair 29, and is guided to a first switch lever 30 for switching transport directions in accordance with copying and printing conditions. The switch lever 30 is operable to direct the recording paper P to a paper discharge passage 31 leading outwardly of the main body X, or to a bypass passage 32 leading to an inlet of the transfer device 9.

Specifically, the first switch lever 30 switches the transport of recording paper P as follows:

When a single original document M is copied onto one side of the recording paper P (which operation is hereinafter referred to as the "simplex copying mode") or when only one hard copy is output (which operation is hereinafter referred to as the "single printing mode"), the first switch lever 30 is moved to a position to guide the recording paper P from the fixing device 28 to the discharge passage 31. This position setting is made regardless of copying conditions such as copying magnification ratios and the number of copies, and printing conditions such as the number of prints. As a result, the recording paper P is discharged face up by a discharge roller pair 33 outwardly of the main body X. The construction for setting the first switch lever 30 to the position to discharge the recording paper P forms a paper discharging device PE.

In the above-mentioned signale printing mode, as described in detail later, a selection may be made between a page arranging mode for discharging plural sheets of the recording paper P face up in an ascending order from top to bottom, and a normal mode in which the sheets are discharged without the page arrangement.

The first switch lever 30 is moved to a position to guide the recording paper P from the fixing device 22 to the bypass passage 32 when one or two original documents M is/are copied onto both sides of the recording paper P (which operation is hereinafter referred to as the "duplex copying mode"), when parts of the document or documents are copied in combination onto one side of the recording paper P (which operation is hereinafter referred to as the "composite copying mode"), or when the recording paper P carrying a duplicate image of a document M is printed with other information by means of the optical printing head PH (which operation is hereinafter referred to as the "composite printing mode"). As a result, the recording paper P is returned to the inlet of the transfer device 9 as will be described later.

The bypass passage 32 includes an intermediate tray 34 for temporarily storing the recording paper P guided into the bypass passage 32. In the composite copying and composite printing modes, the recording paper P is delivered to the intermediate tray 34 by two transport roller pairs 35a and 35b. In the duplex copying mode, the recording paper P is guided by a second switch lever 36 disposed at a position just short of the intermediate tray 34, to proceed into a reversing passage 38 including two transport roller pairs 37a and 37b. In this case, the recording paper P is delivered to the intermediate tray 34 after being turned over by the reversing passage 38.

Figure 1A:
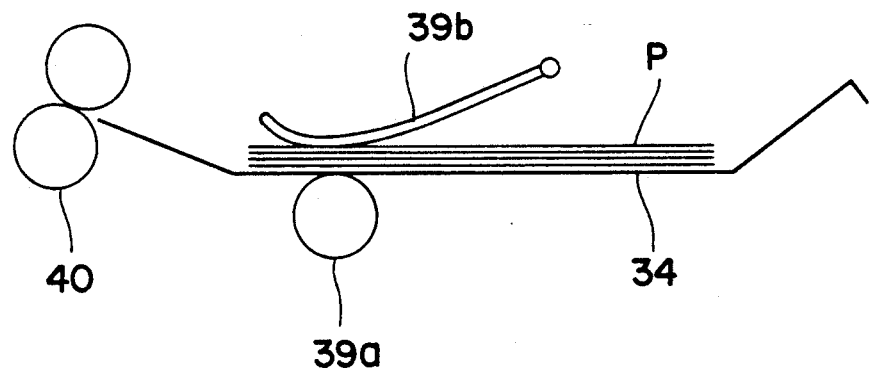
FIG. 1A is a schematic view of a modified paper refeeding device.

The recording paper P is picked up from the intermediate tray 34 by a pickup roller 39 with commencement of a copying operation for the second side in the case of the duplex copying mode or commencement of a second copying or printing operation in the case of the composite copying or printing mode. The recording paper P then passes through a control roller pair 40, and enters the paper feed passage 17 leading to the transfer device 9. The above components are collectively called a paper refeeding device. The paper refeeding device shown in FIG. 1 comprises what is known as the first-in last-out type. Alternatively, as schematically shown in FIG. 1A, a first-in first-out mechanism may be employed which includes a pickup roller 39a acting on the lowermost sheet of recording paper P and a presser lever 39b pushing the recording paper P from top.

In the duplex copying mode, composite copying mode and composite printing mode, the recording paper P is fed to the transfer device 9 under the synchronizing control by the timing roller pair 18 to have a toner image transferred thereto from the photoreceptor drum 6 as in the simplex copying and single printing modes. Subsequently, the toner image is fixed to the recording paper P by the fixing device 28, and the recording paper P is discharged outwardly of the main body X through the discharge passage 31 having the discharge roller pair 33.

When recording information spanning a plurality of pages in a duplex printing mode, only the information for even pages is printed in the ascending order of page numbering on one side of the recording paper P sheet after sheet. The paper refeeding device is not operated till completion of this recording operation. The recording paper P carrying printed images on one side thereof is delivered through the bypass passage 32 to the intermediate tray 34 and stacked face down thereon. When all the information has been printed on one side of the recording paper P (which is hereinafter referred to as the first printing operation), the paper refeeding device is operated to pick up, successively from the top sheet downward, the plural sheets of recording paper P stacked on the intermediate tray 34. The recording paper P is then forwarded to the image forming device where only the information for odd pages is printed in the descending order of page numbering on the reverse side of the recording paper P sheet after sheet (which is hereinafter referred to as the second printing operation). The recording paper P is thereafter discharged outwardly of the main body X. When the number of pages to be printed exceeds the capacity of the intermediate tray 34, the first printing operation is interrupted for automatic switching to the second printing operation to remove the recording paper P from the intermediate tray 34. The first printing operation is resumed upon completion of the second printing operation.

As seen in the righthand side of FIG. 1, a sorter 43 is disposed laterally of the main body X in opposed relationship to the discharge passage 31. The sorter 43 includes paper receiving bins 41 in 20 stages for storing, in groups, plural sheets of recording paper P discharged from the main body X. The sorter 43 further includes an intake roller pair 45 opposed to the discharge roller pair 33 of the main body X, a distributing passage 44 vertically movable for delivering the sheets of recording paper P to appropriate bins 41, and a discharge tray 49 for receiving the recording paper P when the latter is not sorted or grouped by means of the bins 41.

The sheets of recording paper P discharged from the main body X pass through the intake roller pair 45 of the sorter 43. Thereafter the sheets are delivered through the distributing passage 44 of the sorter 43 to the bins 41, or discharged onto the discharge tray 49.

Figure 4:
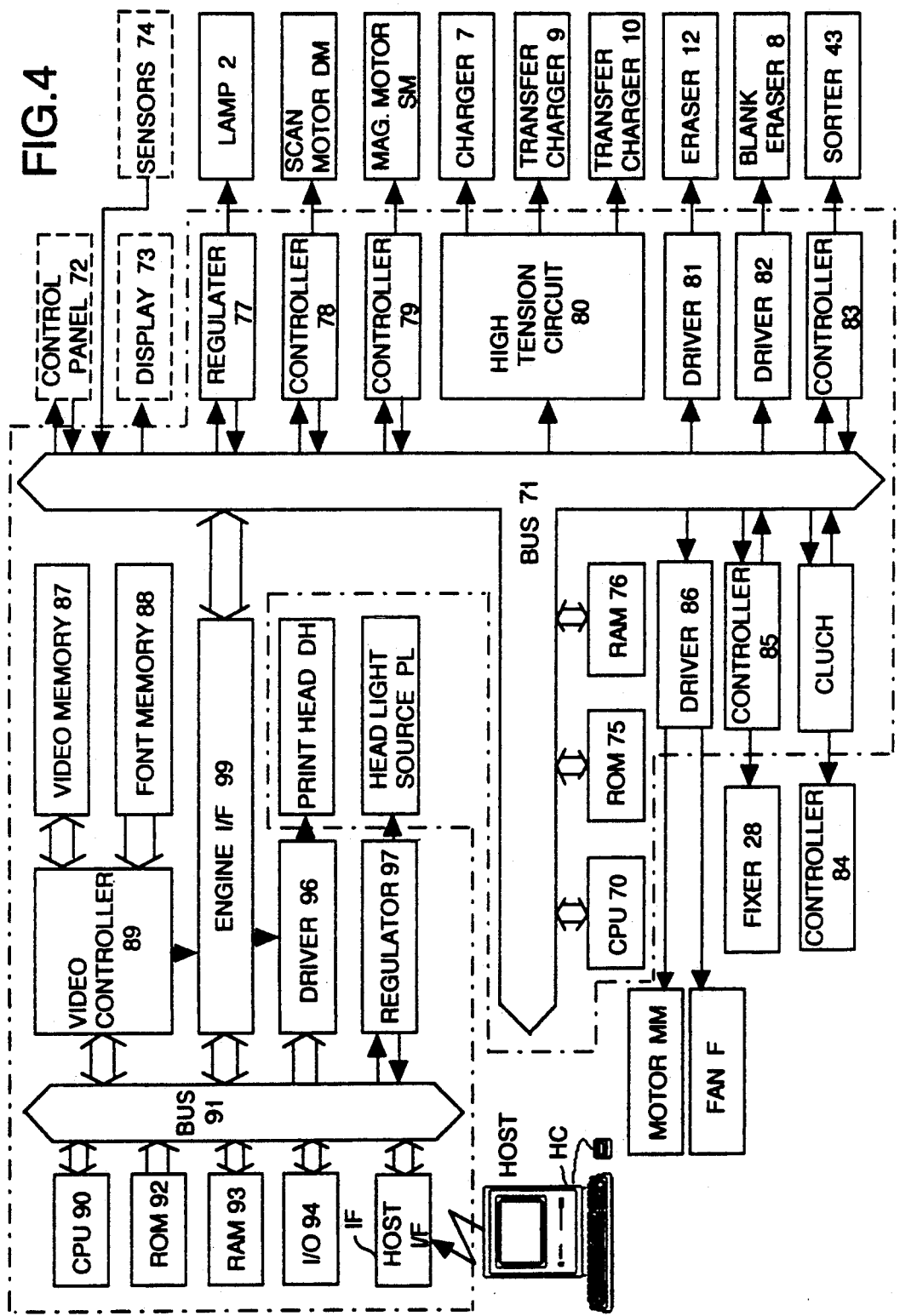
FIG. 4 is a block diagram of a control system.

The information to be recorded is prepared by a recording information output device HC such as a host computer or a word processor connected to this electrophotographic recording apparatus through an interface IF as shown in FIG. 4. When the information to be recorded comprises character information input through a keyboard or stored in a built-in document memory, such information is transmitted as character codes to the control system C of the electrophotographic recording apparatus. When the information to be recorded comprises image information, such information is transmitted as dot data to the control system C of the electrophotographic recording apparatus.

The control system C includes a first CPU 70 for controlling the document scan in the copying operation and an overall electrophotographic process in the copying and printing operations, and a second CPU 90 for controlling writing of recording information in the printing operation.

The first CPU 70 determines copying and printing conditions in response to inputs made through various keys on a control panel 72, and causes the conditions to be displayed on a display panel 73. Further, the first CPU 70 receives output signals through a first bus 71 from various sensors 74 for detecting density of original document M, transport of recording paper P and so on. In addition, a program ROM 75 and a data RAM 76 are connected to the first CPU 70 through the first bus 71.

Based on the control signals received through the first bus 71, the first CPU 70 actuates a regulator 77 for controlling the exposure lamp 2, a controller 78 for controlling a DC motor DM to drive the scanning device S, a controller 79 for controlling a stepper motor SM to vary the conjugate length of the image forming optical system I to vary magnification ratios, high voltage driver circuit 80 for controlling the charging device 7, transfer device 9 and separating device 10, respectively, a driver circuit 81 for driving the main eraser 12, a driver circuit 82 for driving the blank eraser 8, a controller 83 for controlling the sorter 43, a controller 84 for controlling clutches to make and break drive transmission to various driving rollers for transporting the recording paper P, a controller 85 for controlling temperature of the fixing device 28, and a driver circuit 86 for driving a main motor MM and cooling fans F.

The second CPU 90 receives control signals along with recording information from the recording information output device HC through the interface IF and a second bus 91, and control signals from the control panel 72 through the first and second buses 71 and 91 and an interface 99 disposed therebetween. The second CPU 90 determines recording conditions from these control signals, and gives corresponding displays on the display panel 73. The second CPU 90 also receives predetermined output signals from the various sensors 74. Further, a program ROM 92, a data RAM 93 including a working area for program execution and a printer buffer area for printing operations, and an I/O port 94 for communicating signals with external devices are connected to the second CPU 90 through the second bus 91.

In response to the control signals received through the second bus 91, the second CPU 90 actuates a driver circuit 96 for driving the shutter driver circuits 64 of the optical printing head PH, a regulator 97 for controlling a light source PL of the printing head PH, and a video controller 89 for controlling input and output of recording information. When a recording operation is carried out through the image forming device, the second CPU 90 transmits control signals to the first CPU 70 through the second bus 91, interface 99 and first bus 71, thereby actuating the various devices taking part in the electrophotographic process in synchronism with writing of recording information by the optical printing head PH.

The second CPU 90 stores recording information received from the external recording information output device HC in the printer buffer area of data RAM 93 having a storage capacity for a plurality of pages. Upon receipt of a recording request signal from the second CPU 90, the video controller 89 reads the recording information from the data RAM 93 page by page in a fixed order. If this information comprises image information in dots, the information is stored as it is in the video memory 87 of the bit map type having a storage capacity for at least one page. If the information comprises character information, the video controller 89 reads font data in dots corresponding to respective character codes from a font memory 88, and thereafter develops the information on the video memory 87. Thus, the data RAM 93 acts as a storage device, the second CPU 90 a writing device, and the video controller 89 a reading device. The second CPU 90, based on the printing information stored in the video memory 87, controls operations of the shutter driver circuits 64. The shutters of the optical printing head PH corresponding to the pixels, respectively, are thereby driven to form an electrostatic latent image on the photoreceptor drum 6 in accordance with the recording information.

The controller 78 for controlling the DC motor DM causes the scanning device S to move forward, return and stop in response to drive control signals output from the first CPU 70. This controller 78 also receives a shaped pulse signal from an optical encoder attached to the DC motor DM, and transmits the pulse signal to the first CPU 70. On the basis of this signal, the first CPU 70 determines a current position of the scanning device S.

The controller 79 connected to the stepper motor SM for driving the image forming optical system I is operable in response to drive control signals received from the first CPU 70, for driving the image forming lens 4 and the fourth mirror 5d back and forth to establish a conjugate length providing a selected magnification ratio.

The sorter controller 83 controls the sorter 43 in response to control signals received from the first CPU 70. As a result, the sorter 43 is switched between a state for discharging the recording paper P as distributed to the bins 41 and a state for discharging the recording paper P in a batch onto the discharge tray 49.

The second CPU 90 outputs information on a designated magnification ratio and a selected size of copying paper among the recording conditions to the first CPU 70 and video controller 89. When the information on the designated magnification ratio is other than "1", the first CPU 70 controls the controller 79 for the stepper motor SM to set the image forming optical system I to the designated magnification ratio. The first CPU 70 also provides controls to make the selected copying paper size ready for use.

The manner in which controls are effected for putting the pages in order in the duplex printing mode will be described next.

When the duplex printing mode is selected, the second CPU 90 controls the video controller 89 in response to a duplex printing start signal output with a memory full or job end state of the data RAM 93 loaded with recording information spanning a plurality of pages. Then the video controller 89 reads the recording information from the data RAM 93, which corresponds to a first even page, and develops this information on the video memory 87. After an image corresponding to the information is recorded on a sheet of recording paper P supplied to the image forming device, the image-carrying sheet is delivered as turned over to the intermediate tray 34. The above operation is repeated for subsequent even pages in the ascending order. This is the first printing operation. As a result, the sheets of recording paper P are successively stacked face up on the intermediate tray 34, in the ascending order, i.e. page 2, page 4, page 6 and so on, from bottom to top.

Upon completion of the first printing operation for all the recording information stored in the data RAM 93, the paper refeeding device is actuated to pick up the plural sheets of recording paper P stacked on the intermediate tray 34, starting with the top sheet, and deliver the sheets to the image forming device. At the same time, the video controller 89 acting as the reading device is actuated to read the recording information from the data RAM 93, which corresponds to the odd pages, successively in the descending order from the final page, i.e. from a larger page number to a smaller one. The sheets of recording paper P on which images corresponding to this information have been formed are discharged onto the discharge tray 49. This is the second printing operation. At this time, recording is effected in the order of page 5, page 3 and page 1, for example. In the second printing operation, the sheets of recording paper P stacked face down in the order of page 2, page 4 and page 6, for example, on the intermediate tray 34 are picked up one after another from the top sheet for printing in the order of page 5, page 3 and page 1 as noted above. Since the sheets of recording paper P are discharged with the image-carrying sides facing up, i.e. the sides on which the images are recorded by the second printing operation, the sheets of recording paper P as discharged onto the discharged tray 49 are arranged in the order of pages 1-2, 3-4, 5-6 and so on from top to bottom (the hyphens being used to indicate the pages on opposite sides of the sheets, respectively).

When the total amount of recording information exceeds the storage capacity of data RAM 93 and when the number of pages to be printed exceeds the number of sheets of the recording paper P storable on the intermediate tray 34, the first CPU 70 and second CPU 90 discontinue the first printing operation and notify the user that the intermediate tray 34 is full by an indication on the display panel 73 and by sounding a buzzer. Thereafter the first CPU 70 and second CPU 90 move on to the second printing operation to remove plural sheets of the recording paper P successively from the intermediate tray 34 for recording and discharging them onto the discharge tray 49. When removal of the recording paper P from the intermediate tray 34 has been confirmed through detection by a paper sensor provided on or adjacent the intermediate tray 34, for example, a blank sheet of recording paper P having a different size is discharged onto the first batch of recording paper P to distinguish it from a second batch of recording paper P (which is called block sorting). Then the suspended first printing operation is resumed. Since the entire information is divided into a plurality of batches by the blank recording paper P having a different size, the user may only have to put those batches in order after the entire information has been printed. The block sorting may be effected by inserting the same size recording paper having a different color between batches. Where the recording apparatus has a grouping or gathering sorter, the recording paper P may be discharged successively to the plurality of sorting bins.

In the duplex printing mode where the recording information ends in an odd page, a control data is made available for leaving the final even page blank, e.g. printing no information on that page. If the recording information stored in the data RAM 93 ends in an odd page where the information to be recorded exceeds the storage capacity of the data RAM 93, thus requiring block sorting, this final page is not printed as part of the first block but is printed as a first part of a next block.

Further, in the duplex printing mode, a sheet of recording paper P carrying one page of information on one side thereof is returned to the image forming device as turned over by the paper refeeding device with a rear end of that page moving ahead. Therefore, the second printing operation is carried out in a manner reversed from normal printing, i.e. by reading the recording information from the rear end of each page as stored in the data RAM 93. It is of course possible to carry out the second printing operation in the normal order, i.e. by reading the recording information from the leading end of each page as stored in the data RAM 93, with the first printing operation carried out in the reversed order.

The manner in which the sorter 43 is controlled will be described next.

When printing input recording information spanning a plurality of pages, the second CPU 90 controls the video controller 89 and sorter controller 83 to effect the page arrangement with ease.

This control will be described in relation to the single printing mode for simplicity, but it is applicable also to the duplex printing mode. As noted hereinbefore, the data RAM 93 has a sufficient capacity for storing recording information spanning a plurality of pages. The second CPU 90 controls the video controller 89 in response to the duplex printing start signal output with a memory full or job end state of the printer buffer area of data RAM 93 loaded with recording information spanning a plurality of pages. Then the video controller 89 reads the recording information from the data RAM 93, successively from the final page, and develops this information on the video memory 87 for image formation through the optical printing head PH.

In the image forming operation, the recording information stored in the data RAM 93 is printed successively from the final page. At this time, the second CPU 90 compares a total number of pages to be printed with the number of pages corresponding to the storage capacity of the printer buffer area of data RAM 93. Based on this comparison, the second CPU 90 controls the sorter controller 83 to discharge all the recording paper in a batch when the total number of printed pages does not exceed the storable number of pages, and to discharge the recording paper in a divided way when the total number of printed pages exceeds the storable number of pages.

When the total number of printed pages does not exceed the storable number of pages, printed sheets of the recording paper P are successively stacked face up on the discharge tray 49 by the paper discharging device. Consequently, the pages are arranged in the ascending order from top to bottom. The printing operation is completed with completion of the image formation for the entire recording information stored in the data RAM 93 and discharge of all the recording paper P onto the discharge tray 49. In this way, a batch of recording paper P is obtained with the pages arranged in order.

On the other hand, when the total number of printed pages exceeds the storable number of pages, the second CPU 90 further controls the sorter controller 83 to discharge the recording paper P to the uppermost bin 41 of the sorter 43. Consequently, printed sheets of the recording paper P are successively stacked face up in the uppermost bin 41 of the sorter 43 in the ascending order from top to bottom.

After the image formation has been completed for the plurality of pages of recording information stored in the data RAM 93, with the pages arranged in order in the uppermost bin 41 of the sorter 43, the second CPU 90 controls the sorter controller 83 to switch the destination of recording paper P to the second bin 41 from the top. Then the second CPU 90 again controls the video controller 89 to print the next plurality of pages in the same manner as noted above, with a plurality of printed sheets stacked in the page arrangement in the second bin 41.

Thus, the sorter 43, the sorter controller 83 and second CPU 90 cooperate to discharge, as a unit, a plurality of printed sheets of the recording paper with completion of the image formation for the entire recording information spanning a plurality of pages read from the data RAM 93.

All the pages of the recording information are printed by repeating the above operation. The entire records are sorted into batches each corresponding to the storage capacity of the printer buffer area of the data RAM 93, and are stacked in a plurality of bins 41 of the sorter 43. Each batch has the pages arranged in the ascending order from top to bottom, and the batches have progressively greater page numbers from an upper bin to a lower bin. Thus, the entire records may be put in a proper order of page numbering by taking the batch of stacked sheets of recording paper P out of each bin 41 and placing the batches together in the order corresponding to the vertical order of the bins 41.

As described above, the printer buffer area of data RAM 93 has a storage capacity for input recording information spanning a plurality of pages. Images are formed for the recording information stored in the data RAM 93, successively from the final page. The information is recorded on plural sheets of recording paper P which are discharged face up and in batches as automatically arranged in a proper order of page numbering. After the entire information has been printed, all the pages may be arranged by a simple operation. Thus, no reversing device is required for reversing the discharged recording paper P from a face up state to a face down state. Since information is recorded successively from the final page, the printer buffer area of data RAM 93 may have a storage capacity just enough for a limited number of pages, which is compensated for by the plural batchwise printing processes. This feature expedites the page arranging operation without requiring a large and expensive apparatus.

Further, only a slight modification to the control mode of the sorter 43 is sufficient for utilization of the sorter 43 for sorting printed sheets of the recording paper P to realize the above function. This results in an advantage from the cost point of view. As described above, the batches of the recording paper P having larger page numbers, each arranged in order, are successively placed in the lower bins 41. Consequently, all the pages may be put to order by a simple operation to stack the batches one upon another without changing their order after the entire information is printed.

Actual operations carried out under varied printing conditions will be described next. As noted hereinbefore, all the printed sheets of recording paper P are discharged in a batch onto the discharge tray 49 when an actual number or total number of printed pages does not exceed the number of pages corresponding to the storage capacity of the printer buffer area of data RAM 93. The printed sheets of recording paper P are discharged as distributed to the bins 41 of the sorter 43 when the total number of printed pages exceeds the storable number of pages. The total number of pages to be printed may be grasped by counting page feed control codes, control signals for setting line spacing and line feed control codes input along with the recording information. The comparison between the total number of pages to be printed and the storable number of pages may be made by checking whether or not a control code marking the end of recording information is input before the information in the printer buffer area of data RAM 93 reaches a predetermined amount.

However, ordinary application software seldom outputs a control code marking the end of recording information. In this case, the time from receipt of a page feed control code to input of a next data may be counted and a job may be regarded as having ended in the absence of an input for a predetermined time. Generally, an initial command is transmitted at the beginning of a job, and therefore the preceding job may be regarded as having ended upon receipt of this command. It is also possible to request transmission of page information (the number of pages) at the beginning of a job for grasping the end of the job. For expediency of description, these devices are herein collectively called the control code marking the end of recording information.

A standard operation for one job in which the recording paper P is discharged as distributed has already been described. The second CPU 90 causes the state of distributed discharge to be displayed on the discharge panel 73, and completion of a printing operation for one job to be notified by sounding a buzzer. If some of the bins 41 of the sorter 43 are left empty at this time, a next job may be started immediately to print information and successively discharge the recording paper P as distributed to the empty bins 41. If all the bins 41 become full in the course of one job, the printing operation is discontinued and the user is prompted by a display on the display panel 73 and sounding of a buzzer to remove the printed sheets of recording paper P from the bins 41. After removal of the recording paper P, the suspended printing operation is resumed to start discharging the recording paper P to the uppermost bin 41 again. A sensor is provided for each bin 41 to detect whether the bin 41 is full or not.

On the other hand, when a plurality of printed copies are obtained in one job, printed sheets of the recording paper P are discharged onto the discharge tray 49 unless page arrangement and gathering are required. If only gathering is required, a region corresponding to one page of the printer buffer area of data RAM 93 is used to print a plurality of copies of each page and discharge the recording paper P as distributed. When a plurality of printed copies are obtained with both page arranging and gathering requirements, and the total number of pages exceeds the storable number of pages, the twenty bins 41 are divided into two groups of ten each and printed copies of the recording paper P are discharged as distributed to each group although this applies only to the case of obtaining two copies of each page. Specifically, the first copies of the respective pages are distributed to the uppermost bin 41 and then to successively lower bins 41, and the second copies are distributed to the 11th bin 41 and to successively lower bins 41. When three or more copies are printed for one page, the first two copies are printed as described above, and thereafter the same printing operation is repeated for the first page onward by inputting the same recording information to the printer buffer area of data RAM 93. Depending on the number of bins 41, the bins 41 may be divided into three or more groups corresponding to the number of copies. Further, when a plurality of printed copies are obtained with the page adjusting and gathering requirements, and the total number of pages to be printed does not exceed the storable number of pages, the printed pages may be distributed a copy each to the respective bins 41, thereby producing a plurality of copies each arranged in the order of paging numbering.

Reverting to the block diagram of FIG. 4, the first CPU 70 and second CPU 90 automatically restore the standard copying or printing conditions if a copying or printing operation is not effected under prevailing conditions before lapse of a predetermined time (e.g. three minutes) from setting of the above specific copying or printing conditions or from completion of a copying or printing operation carried out under those conditions. This is called an auto reset function.

In the single and other printing modes and in the simplex and other copying modes, the various devices are switchable by the control signals output from the first CPU 70 and second CPU 90. The resulting states of these devices are set out in Table 1 below. In the table, "ON" represents an operative state and "OFF" an inoperative state.

TABLE 1

| Modes of Operation | Recording | Copying |
| --- | --- | --- |
| Charging Device 7 | ON | ON |
| Printing Head PH | ON | OFF |
| Scanning Device S | OFF | ON |
| Developing Device D | ON | ON |
| Transfer & Separating Devices 9 and 10 | ON | ON |
| Cleaning Device 11 | ON | ON |
| Main Eraser 12 | ON | ON |
| Fixing Device 28 | ON | ON |

The operating sequences of this electrophotographic recording apparatus will be described next with reference to the flowcharts shown in FIGS. 5 through 8.

Figure 5:
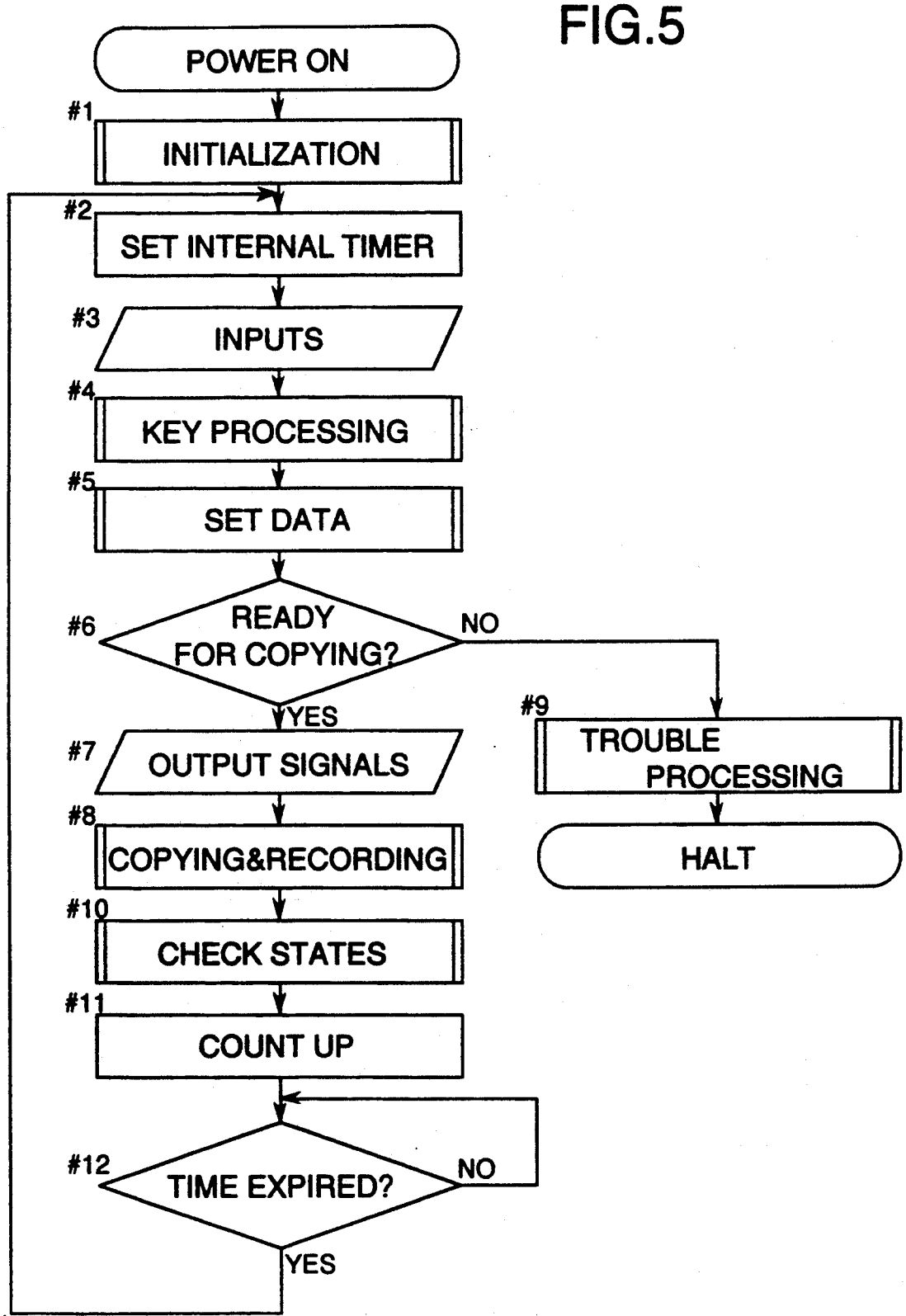
FIGS. 5 through 8 are flowcharts illustrating operations of the recording apparatus.

FIG. 5 shows a main routine for controlling an overall copying and printing operation.

The main routine starts when the apparatus is switched on, to carry out initialization at step #1 for clearing all registers and flags in the first CPU 70, RAM and the like and setting the standard copying conditions. Thereafter, an internal timer is set for determining the length of one routine at step #2.

Next, at step #3, inputs are made through the keys on the control panel 69 and through switches and sensors provided at other positions of the apparatus, and through a print start flag of the second CPU 90. At step #4, a key processing subroutine is called for changing the copying or printing conditions in response to the inputs made through the keys on the control panel 69. At step #5, a data setting subroutine is called for setting data to be displayed on the display 73.

Subsequently, checking is made at step #6 whether the apparatus is in order for starting a copying or printing operation or any abnormality or trouble has occurred. In the absence of trouble, control and display signals are output at step #7, and a copying and printing subroutine is called at step #8 to carry out a copying or printing operation under the various conditions set to the apparatus.

If trouble is found at step #6, a trouble processing subroutine is called at step #9 for stopping the device from taking part in the copying or printing operation and for providing a display that trouble has occurred. After removal of the trouble, the program waits for a reset button to be pressed.

After a return from the copying and printing subroutine, checking is made at step #10 as to various states of the recording apparatus, i.e. presence or absence of developing toner in the developing device 8, presence or absence of copying paper P in the paper feed cassettes 12a and 12b, the temperature of fixing rollers in the fixing device 28, and so on. After the internal timer finishes counting at step #11, the program stands by at step #12 until the time set in the timer expires. Upon expiration of the time, the program returns to step #2 and repeats the foregoing sequence.

Figure 6:
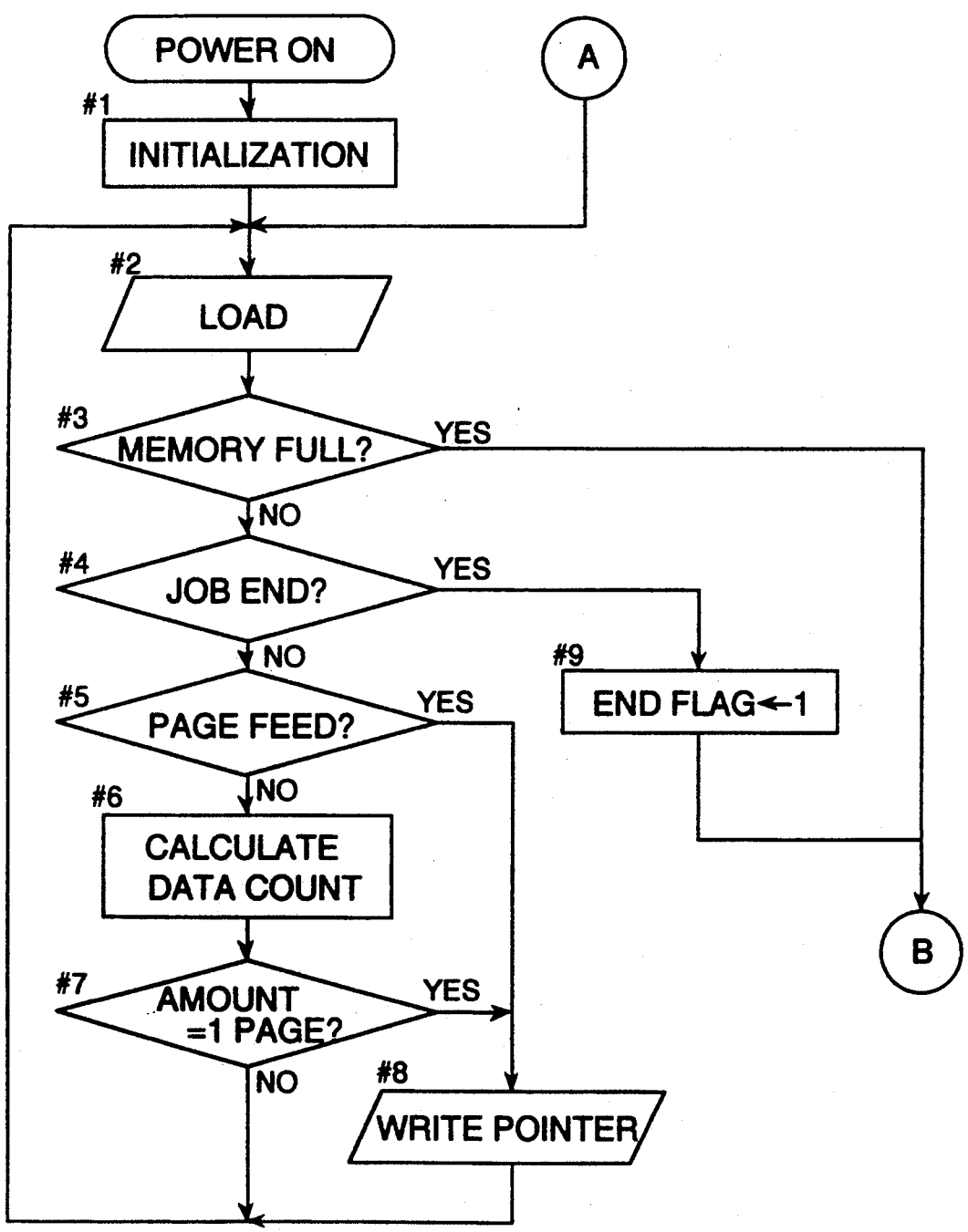

FIG. 6 is a flowchart showing a basic sequence for carrying out the simple printing operation to output printed sheets of the recording paper P in the order of page numbering. This routine starts when the apparatus is switched on, to carry out initialization at step #1 for clearing all registers and flags in the second CPU 90, RAM and the like and setting the standard printing conditions. Thereafter, input recording information is written into the printer buffer area of data RAM 93 at step #2. The program moves to step #3 for checking if the printer buffer area of data RAM 93 is full, and to step #4 for checking if a job end code appears. Until the printer buffer area becomes full or a job end code appears, subsequent recording information is repeatedly written into the printer buffer area. Meanwhile, step #5 is executed to check if there is a page feed code. If there is, the program jumps to step #8 for writing a pointer marking a page boundary in the working area of data RAM 93. If there is no page feed code, the program moves to step #6 for calculating an amount of data from a line spacing signal and a count of lines. When it is determined at step #7 that the amount of data has reached an amount corresponding to one page, step #8 is executed to write the pointer. After step #8, subsequent recording information is repeatedly written into the printer buffer area.

Figure 7:
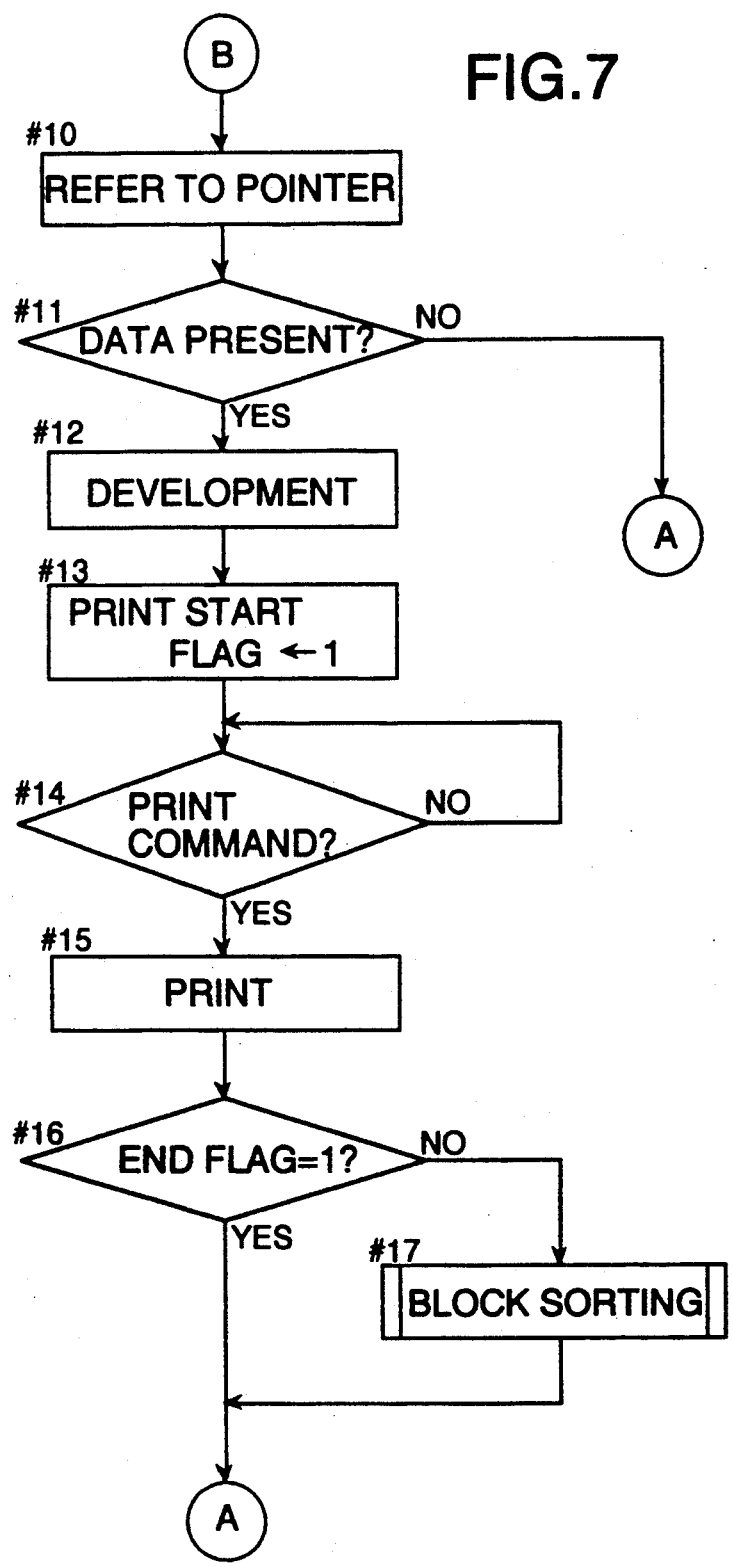

When a job end code is detected at step #4, the program moves to step #9 for setting an end flag and then to step #10 in FIG. 7. The program moves to step #10 in FIG. 7 also when the printer buffer area of RAM 93 is found full at step #3.

At step #10, reference is made to the pointer. Then, it is checked at step #11 whether or not there is data in the printer buffer area or not. If there are, step #12 is executed to develop the data from the final page in the bit map memory 87 by referring to the pointer in the case of simple printing. Then the program moves to step #13 for setting the print start flag, and to step #14 for waiting for output of a print command from the first CPU 70. When a print command is output at a predetermined timing, the data is successively read from the bit map memory 87 for printing at step #15. If step #16 finds the end flag set, the program returns to step #10. Otherwise, the program executes step #17 for block sorting, and returns to step #10. Then the next page is developed by referring to the pointer. If the pointer shows absence of data from the printer buffer area, the program returns to step #2 to repeat the above sequence.

Next, a basic sequence for carrying out an operation in the duplex printing mode by the second CPU 90 to output printed sheets of the recording paper P in the order of page numbering will be described. The first half of this routine, i.e. the flowchart shown in FIG. 6 is the same as the foregoing page arranging process, and its description is not repeated. When a job end code is detected at step #4 in FIG. 6, the program executes step #9 for setting the end flag and moves to step #10 in FIG. 8. The program moves to step #10 in FIG. 8 also when the printer buffer area of RAM 93 is found full at step #3.

Figure 8:
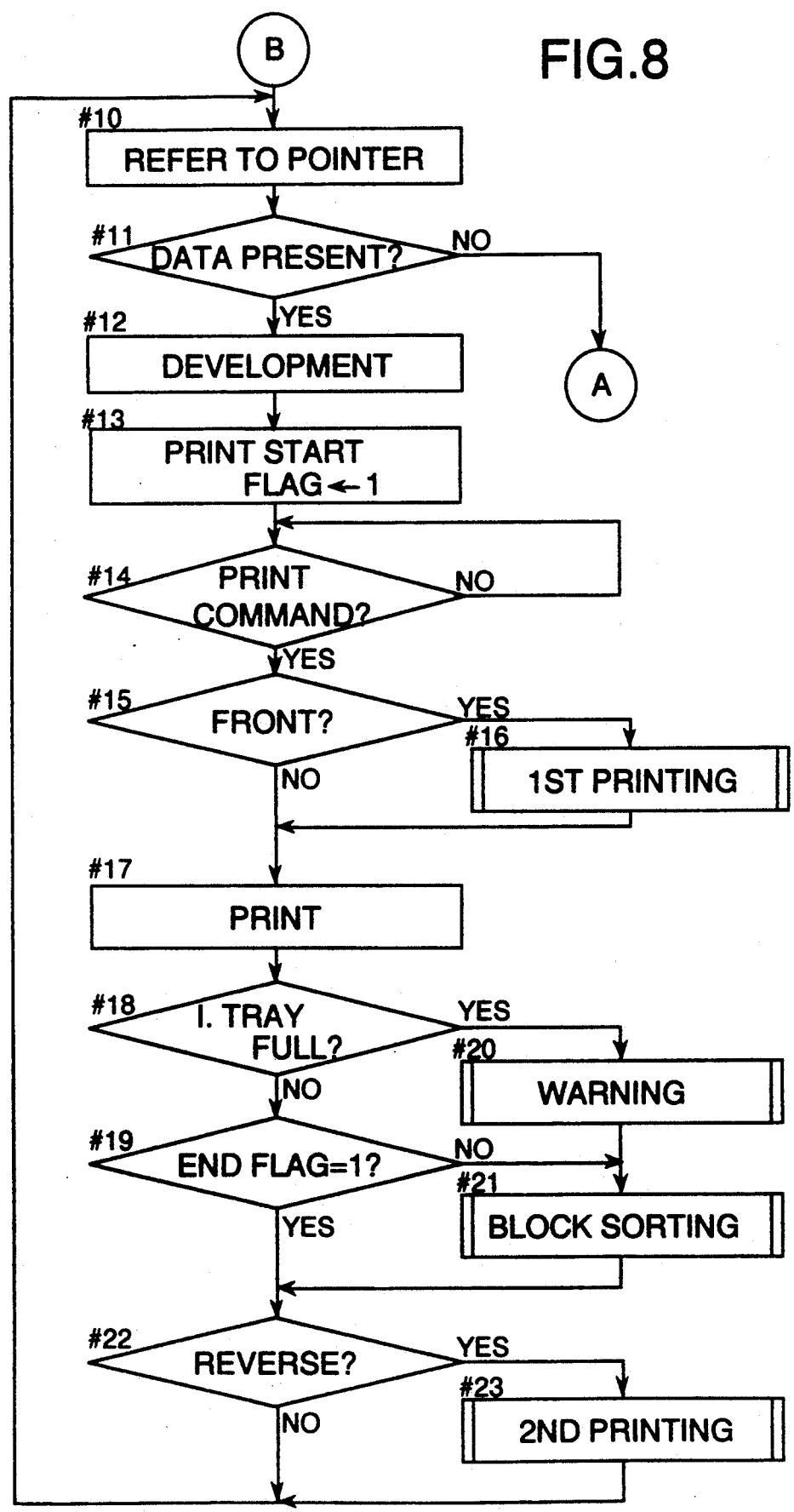

At step #10 in FIG. 8, reference is made to the pointer. Then, it is checked at step #11 whether or not there is data in the printer buffer area. If there is, step #12 is executed to develop the data from the first even page in the bit map memory 87 by referring to the pointer. Then the program moves to step #13 for setting the print start flag, and to step #14 for waiting for output of a print command from the first CPU 70. When a print command is output at a predetermined timing, step #15 is executed to check if this is for printing on the front side of the recording paper. If it is, a first printing routine is called at step #16, and the data are successively read from the bit map memory 87 for printing at step #17. Printed sheets of the recording paper P are delivered to the intermediate tray 34, and the above process is repeated until the intermediate tray 34 is found full at step #18 or completion of the first printing operation is detected at step #19. If, in the course of the first printing operation, the intermediate tray 34 is found to be full at step #18, the program moves to step #20 for giving a display and warning to that effect, step #21 for block sorting, and to steps #22 and #23 for executing a second printing routine to remove the recording paper P from the intermediate tray 34 and carry out the second printing operation. Upon completion of the second printing operation, the program returns to step #10 and resumes the first printing operation. If the first printing operation comes to an end before the intermediate tray 34 becomes full, the second printing routine is executed at steps #22 and #23 to remove the recording paper P from the intermediate tray 34 and carry out the second printing operation.

If step #19 finds the end flag set, the program returns to step #10 through steps #22 and #23. Otherwise, the program executes step #21 for block sorting, and returns to step #10.

If the pointer shows absence of data from the printer buffer area (step #11), the program returns to step #2 to repeat the above sequence.

The first printing operation, warning, block sorting and second printing operation are actually controlled by the first CPU 70, but are included in the flowcharts as illustrated for expediency of explanation.

Other embodiments of the present invention are set out hereinafter.

(1) The sorter 43 is used in the described embodiment for sorting recording paper. However, the present invention may be worked by replacing the sorter 43 with various devices as noted hereunder for outputting printed sheets of recording paper as arranged in the order of page numbering when a total number of pages exceeds the number of pages storable in the data RAM 93.

(1-1) The discharge tray 49 may be adapted to movable in a direction perpendicular to the direction in which printed sheets of recording paper P are discharged by the paper discharging device. In this case, the discharge tray is moved a predetermined amount each time a batch of records corresponding to plural pages of recording information read from the data RAM 93 has been output in the order of page numbering. Consequently, individual batches of the recording paper P are placed on different positions of the discharge tray 49 as arranged in the order of page numbering.

(1-2) Recording paper of a different size, or fed in a different orientation, such as longitudinal feeding or transverse feeding, may be stored in a paper feed tray other than the paper feed tray storing the recording paper P used for printing. This different recording paper is inserted successively between adjacent batches of printed sheets of the recording paper P arranged in the order of page numbering.

(1-3) Sorting paper of the same or different size and having a different color may be stored in a paper feed tray other than the paper feed tray storing the recording paper P used for printing. This sorting paper is inserted successively between adjacent batches of printed sheets of the recording paper P arranged in the order of page numbering.

(1-4) Blank recording paper P may be taken out of the same paper feed tray each time a batch of printed sheets is output, for insertion between adjacent batches. Since, in this case, the boundary between adjacent batches is difficult to identify, it is considered advantageous to discharge the blank paper to a slightly displaced position or in a different orientation.

(2) Various modifications may be made to the other components of the apparatus as follows:

(2-2) The foregoing embodiment includes the optical printing head PH having the PLZT shutter array 62. The optical printing head PH may have a liquid crystal shutter array or a LED array instead. Further, the optical printing head PH may comprise the type to emit light beams such as laser beams to the photoreceptor drum 6.

(2-2) The DC motor DM provided in the foregoing embodiment for driving the scanning device S may be replaced by a stepper motor or various other types of motors. Where a stepper motor is employed, pulses for driving this motor may be counted. Then the position of the scanning device S may be detected without necessitating an optical encoder as in the described embodiment.

(2-3) The photoreceptor drum 6 may be replaced by a belt-like photosensitive element wound around a pair of rollers.

(2-4) In the foregoing embodiment, the exposure lamp 2 and slit 3 are movable while the document M is held stationary on the document table 1, for copying the document M. Alternatively, the exposure lamp 2 and slit 3 may be fixed against movement, with the document table 1 designed to be movable.

(2-5) In the foregoing embodiment, both the copying and printing operations utilize the electrophotographic process and share the same components excluding the construction for exposing the photosensitive member 6, to realize a low cost apparatus. However, the present invention may be practiced by carrying out the printing operation by an ink jet system or a thermal transfer system, with the copying operation carried out by the electrophotographic process. The construction for copying documents may be omitted from the apparatus.

(2-6) The present invention may be applied to a digital copier comprising, instead of the analog scanning device S, a document reading device of the type to convert a document image into an electric signal through a CCD.

Moreover, the following modifications are possible in relation to the page arrangement for the duplex printing mode:

(3) Recording information may be read from the data RAM 93 such that information for odd pages is read in the descending order, such as page 5, page 3 and page 1, for carrying out the first printing operation, and information for even pages read in the ascending order, such as page 2, page 4 and page 6, for carrying out the second printing operation. As a result, printed sheets of recording paper P are arranged on the discharge tray 49 in the order of pages 1-2, 3-4, 5-6 and so on from top to bottom.

(4) In the description of the page arranging mode, the recording paper P stacked on the intermediate tray 34 is picked up from the top sheet in the first-in last-out fashion by the paper refeeding device for feeding to the image forming device. Alternatively, the paper refeeding device may be constructed to pick up the recording paper P on the intermediate tray 34 from the bottom sheet in the first-in first-out fashion to realize a similar page arrangement. In this case, however, the recording information should be read from the data RAW 93 in the same, ascending or descending, order of page numbering for the first and second printing operations.

(5) The foregoing printing and copying functions may be utilized to form different images on front sides of plural sheets of the recording paper P, and the same image on reverse sides thereof.

(6) In the foregoing embodiment, the printing operation is controlled to leave the final even page blank when an odd number of pages is to be printed. Alternatively, the printing operation may be controlled to leave the reverse side of page 1 blank, i.e. to output page 1, pages 2-3, pages 4-5 and so on.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recording apparatus comprising:
    memory means for storing recording information input from an external device, said memory means capable of storing a predetermined amount of data;
    write control means for successively writing the recording information input from the external device into said memory means, and stopping a writing operation when the recording information stored reaches the predetermined amount;
    read control means for reading the recording information from said memory means in an order opposite to an order in which the recording information is written;
    recording means for recording the recording information read by said read control means onto recording paper; and
    resuming means for controlling said write control means to resume the write operation upon completion of an operation of said recording means.

2. A recording apparatus comprising:
    memory means for storing recording information input from an external device, said memory means capable of storing a predetermined amount of data;
    write control means for successively writing the recording information spanning a plurality of pages into said memory means in an order of input from the external device, and stopping a writing operation when the recording information stored reaches the predetermined amount;
    write control means for successively writing the recording information spanning a plurality of pages into said memory means in an order of input from the external device, and stopping a writing operation when the recording information stored reaches the predetermined amount;
    read control means for reading the recording information from said memory means in an order opposite to the order in which the recording information is written;
    recording means for continuously recording the recording information spanning the plurality of pages read by said read control means onto recording paper; and
    resuming means for controlling said write control means to resume the write operation upon completion of an operation of said recording means.

3. A recording apparatus as claimed in claim 2, further comprising sorting means for sorting recorded sheets of said recording paper with each series of recording operations of said recording means.

4. A recording apparatus as claimed in claim 3, wherein said sorting means includes a plurality of paper receiving bins each for receiving the recorded sheets of said recording paper resulting from each series of recording operations.

5. A recording apparatus as claimed in claim 3, wherein said sorting means includes a shift tray for receiving said recording paper, said shift tray being shiftable with each series of recording operations.

6. A recording apparatus comprising:
    memory means for storing recording information input from an external device, said memory means capable of storing a predetermined amount of data;
    write control means for successively writing the recording information spanning a plurality of pages into said memory means in an order of input, and stopping a writing operation when the recording information as stored reaches the predetermined amount;
    read control means for reading recording information from said memory means in an order opposite to the order in which the recording information is written;
    first paper feed means for storing a first type of recording paper;
    second paper feed means for storing a second type of recording paper;
    recording means for continuously recording the recording information spanning the plurality of pages read by said read control means onto the recording paper supplied from said first paper feed means and discharging the recording paper onto a discharge tray; and
    sorting means for supplying the recording paper from said second paper feed means upon completion of each series of recording operations of said recording means and discharging the recording paper onto the discharge tray.

7. A recording apparatus as claimed in claim 6, wherein said sorting means is operable to prohibit operation of said recording means.

8. A recording apparatus as claimed in claim 7, wherein the first and second types of recording paper have different sizes.

9. A recording apparatus as claimed in claim 7, wherein the first and second types of recording paper have different colors.

10. A recording apparatus as claimed in claim 6, further comprising resuming means for controlling said write control means to resume the write operation upon completion of an operation of said recording means.

11. A recording apparatus as claimed in claim 6, further comprising:
intermediate storage means for storing the plurality of pages between a first recording operation and a second recording operation, wherein said sorting means comprises means for supplying the recording paper from said second tray when said intermediate storage means is empty after said second recording operation.

12. A recording apparatus comprising:
memory means for storing recording information input from an external device, said memory means capable of storing a predetermined amount of data;
write control means for successively writing the recording information spanning a plurality of pages into said memory means in an order of input from the external device, and stopping a writing operation when the recording information stored reaches the predetermined amount;
read control means for continuously reading recording information corresponding to every other page of said plurality of pages from said memory means and thereafter continuously reading recording information corresponding to the rest of said plurality of pages from said memory means;
recording means for continuously recording the recording information read by said read control means onto recording paper; and
paper refeed means for continuously storing the recording paper having recorded information corresponding to said every other page on first faces thereof and thereafter continuously supplying the recording paper to said recording means for recording information corresponding to the rest of said plurality of pages on second faces thereof.

13. A recording apparatus as claimed in claim 12, wherein said paper refeed means is operable in a first-in first-out mode.

14. A recording apparatus as claimed in claim 13, wherein the recording paper recording the information corresponding to said every other pages in the order of input is stored in said paper refeed means, and thereafter the information corresponding to the rest of said plurality of pages is recorded on the second faces thereof in the order of input.

15. A recording apparatus as claimed in claim 12, wherein said paper refeed means is operable in a first-in last-out mode.

16. A recording apparatus as claimed in claim 15, wherein the recording paper recording the information corresponding to said every other pages in an opposite order of input is stored in said paper refeed means, and thereafter the information corresponding to the rest of said plurality of pages is recorded on the second faces thereof in the order of input.

17. A recording apparatus as claimed in claim 12, further comprising resuming means for controlling said write control means to resume the write operation upon completion of an operation of said recording means.

18. A recording apparatus comprising:
memory means for storing recording information spanning a plurality of pages;
write means for writing the recording information into said memory means;
read means for reading the recorded information from said memory means, said reading means capable of continuously reading half of said stored recording information and thereafter continuously reading another half of said stored recording information;
paper feed means for feeding recording paper from a paper supply section;
recording means for recording the recording information read by said read means onto the recording paper;
discharging means for discharging the recording paper carrying recorded information; and
transport means for refeeding the recording paper carrying recorded information to said recording means as reversed, said transport means including reversing means for reversing the recording paper, an intermediate tray for storing plural sheets of the recording paper, branched passage means for delivering the recording paper carrying recorded information to said intermediate tray as stacked thereon, and paper refeed means for refeeding the recording paper from said intermediate tray to said recording means;
wherein said apparatus has a duplex recording function including a first recording operation for successively recording half of said stored recording information on at least one of the plural sheets of the recording paper fed from said paper supply section and delivering the recording paper to said intermediate tray, and a second recording operation carried out upon completion of the first recording operation for successively recording another half of said stored recording information on the recording paper fed from said intermediate tray.

19. A recording apparatus as claimed in claim 18, wherein said paper refeed means is operable to pick up the recording paper stored on said intermediate tray from an uppermost sheet, and said read means is operable to read information corresponding to one of sets of odd pages and even pages in an ascending order of page numbering from said memory means during the first recording operation, and information corresponding to the other set of odd pages and even pages in a descending order of page numbering from said memory during the second recording operation.

* * * * *

UNITED STATES PATENT AND TRADEMARK OFFICE
CERTIFICATE OF CORRECTION

PATENT NO. : 5,206,684
DATED : April 27, 1993
INVENTOR(S) : Kenichi WADA et al

It is certified that error appears in the above-indentified patent and that said Letters Patent is hereby corrected as shown below:

In Column 20, delete lines 10-15 as follows:

--write control means for successively writing the recording information spanning a plurality of pages into said memory means in an order of input from the external device, and stopping a writing operation when the recording information stored reached the predetermined amount;--.

Signed and Sealed this

Twenty-sixth Day of April, 1994

Attest:

BRUCE LEHMAN

Attesting Officer     Commissioner of Patents and Trademarks